US009235486B1

(12) United States Patent
    Casaburi et al.

(10) Patent No.: US 9,235,486 B1
(45) Date of Patent: Jan. 12, 2016

(54) TECHNIQUES FOR SPARE STORAGE POOL MANAGEMENT

(71) Applicant: Symantec Corporation, Mountain View, CA (US)

(72) Inventors: Jim Casaburi, Rancho Palos Verdes, CA (US); William Allen, Los Angeles, CA (US)

(73) Assignee: Symantec Corporation, Mountain View, CA (US)

(*) Notice: Subject to any disclaimer, the term of this patent is extended or adjusted under 35 U.S.C. 154(b) by 206 days.

(21) Appl. No.: 14/042,127

(22) Filed: Sep. 30, 2013

(51) Int. Cl.
| G06F 11/00 | (2006.01) |
| G06F 11/20 | (2006.01) |
| G06F 11/07 | (2006.01) |
| G06F 11/10 | (2006.01) |
| G06F 11/16 | (2006.01) |

(52) U.S. Cl.
CPC ........ *G06F 11/2094* (2013.01); *G06F 11/0727* (2013.01); *G06F 11/1084* (2013.01); *G06F 11/1612* (2013.01); *G06F 11/2053* (2013.01)

(58) Field of Classification Search
CPC ............ G06F 11/2094; G06F 11/0727; G06F 11/0751; G06F 11/0754; G06F 11/076; G06F 11/10; G06F 11/1008; G06F 11/1076; G06F 11/1084; G06F 11/1088; G06F 11/1092; G06F 11/1612; G06F 11/2053
USPC ........ 714/6.13, 6.1, 6.22, 6.2, 6.24, 6.3, 6.32, 714/42, 47.1, 47.2
See application file for complete search history.

(56) References Cited

U.S. PATENT DOCUMENTS

| 8,086,893 B1* | 12/2011 | MacFarland et al. ............. 714/3 |
| 2009/0282301 A1* | 11/2009 | Flynn et al. .................... 714/710 |
| 2012/0284453 A1* | 11/2012 | Hashimoto .................... 711/103 |
| 2013/0311705 A1* | 11/2013 | Cheng et al. ................... 711/103 |
| 2014/0164674 A1* | 6/2014 | Verhaeghe et al. ............ 711/102 |
| 2015/0058530 A1* | 2/2015 | Reddy et al. ................... 711/103 |

OTHER PUBLICATIONS

"Bad Pool Sector," Tom's Hardware Forums, Sep. 28, 2010, as printed Oct. 28, 2013, http://www.tomshardware.com/forum/262569-32-pool-sector, 3 pages.
"Bad Pool Sector BSOD—Windows 7 64-bit," TechSpot Forums, Dec. 15, 2011, as printed Oct. 28, 2013, http://www.techspot.com/community/topics/bad-pool-sector-bsod-windows-7-64-bit.174755/, 4 pages.

(Continued)

*Primary Examiner* — Joseph D Manoskey
(74) *Attorney, Agent, or Firm* — Wilmer Cutler Pickering Hale and Dorr LLP (57) ABSTRACT

Techniques for spare storage pool management are disclosed. In one particular embodiment, the techniques may be realized as a method for spare storage pool management comprising receiving spare storage configuration information for a storage drive pool comprising a plurality of storage drives, maintaining spare storage mapping information to spare storage within the storage drive pool based at least in part on the spare storage configuration information, monitoring spare storage within the storage drive pool for detecting block failures within the storage drive pool, detecting a failure of a block in a first storage drive of the plurality of storage drives, and updating the spare storage mapping information associated with the failed block in the first storage drive to map to a spare block in a second storage drive of the plurality of storage drives.

17 Claims, 4 Drawing Sheets

(56) References Cited

OTHER PUBLICATIONS

Usman Javaid, "What are Physical & Logical Bad Sectors of Hard Drive and How to Repair Them [Guide]," Jan. 26, 2012, http://www.addictivetips.com/windows-tips/what-are-physical-logical-hard-drive-bad-sectors-how-to-repair-them/, 10 pages.

"How to Fix Bad Pool Caller," eHow, Copyright 1999-2013 by Demand Media, Inc., as printed Oct. 28, 2013, http://www.ehow.com/how_5781000_fix-bad-pool-caller.html, 3 pages.

"How to Use a Disk with High Reallocated Sector Count?" Server Fault Forum, May 10, 2012, as printed on Oct. 28, 2013, http://serverfault.com/questions/387765/how-to-use-a-disk-with-high-re-allocated-sector-count, 4 pages.

"Software Raid and Forcing Bad Sectors to Remap," LinuxQuestions.org Forum, Aug. 9, 2012, as printed Oct. 28, 2013, http://www.linuxquestions.org/questions/linux-server-73/software-raid-and-forcing-bad-sectors-to-remap-4175421215/, 4 pages.

"SuperTrak EX8760T/8768 6Gb SAS and SATA Hardware RAID Controllers," Promise Technology, Inc., as printed Oct. 28, 2013, http://www.promise.com/media_bank/Download%20Bank/Datasheet/ST%20EX8760_8768%20DS_20091127.pdf, 2 pages.

Mace Moneta, "Bug 69338—RAID-1 Bad Block Remapping," Red Hat Bugzilla, Jul. 21, 2002, last modified Aug. 1, 2008, as printed Oct. 28, 2013, https://bugzilla.redhat.com/show_bug.cgi?id=69338, 5 pages.

\* cited by examiner

TECHNIQUES FOR SPARE STORAGE POOL MANAGEMENT

FIELD OF THE DISCLOSURE

The present disclosure relates generally to improving reliability of storage pools and, more particularly, to techniques for spare storage pool management.

BACKGROUND OF THE DISCLOSURE

Storage drives wear out over time. For example, both flash memory cells in a solid-state drive (SSD) and spinning disk sectors in a mechanical hard disk drive (HDD) can degrade or otherwise become unusable over time. The average time it takes for a storage drive to wear out to the point of failure is called the Mean Time Before Failure (MTBF). Techniques to extend the useful life of a drive increase its MTBF.

Spinning disk sectors and flash memory cells degrade or become unusable in a relatively unpredictable manner. The failure of one sector or cell does not necessarily imply the same for others. For example, magnetic sectors from spinning disks may be written to or read from many times without a given limit, and, without warning, may fail to process a write or read properly. In the case of flash memory, cells wear out on average after a given number of write "cycles," in addition to other unpredictable and sudden failures.

To compensate for these failures, storage drive manufactures can overprovision the storage drive with spare groups of sectors or cells called blocks. Instead of counting the spare blocks toward the stated capacity of the storage drive, the storage drive reserves the spare blocks to increase its MTBF. In the case of memory that wears out over time such as flash memory, the spare blocks may also be used for wear leveling. Wear leveling spreads write commands to the storage drive more evenly across all of its blocks to increase the time it would take for any one block to fail. As blocks do fail, the spare blocks may be used to replace the failed blocks. The bigger the pool of spare blocks, the longer a storage drive is likely to function according to its MTBF. Due to the unpredictable nature of these failures, individual storage drives deplete their pools of spare blocks at different times, even if the drives are all part of the same storage pool, e.g., Redundant Array of Independent Disks (RAID). Any drive failure in a storage pool poses the risk of potential data loss. Even in redundant or parity-based storage pools, any drive failure in a storage pool poses a potential data loss risk due to a reduction of fault tolerance until the drive is replaced in the pool.

In view of the foregoing, it may be understood that there may be significant problems and shortcomings associated with conventional technologies for managing spare blocks in a storage drive pool.

SUMMARY OF THE DISCLOSURE

Techniques for spare storage pool management are disclosed. In one particular embodiment, the techniques may be realized as a method for spare storage pool management comprising receiving spare storage configuration information for a storage drive pool comprising a plurality of storage drives, maintaining spare storage mapping information to spare storage within the storage drive pool based at least in part on the spare storage configuration information, monitoring spare storage within the storage drive pool for detecting block failures within the storage drive pool, detecting a failure of a block in a first storage drive of the plurality of storage drives, and updating the spare storage mapping information associated with the failed block in the first storage drive to map to a spare block in a second storage drive of the plurality of storage drives.

In accordance with further aspects of this particular embodiment, wherein the spare block may comprise at least one flash memory cell of a solid-state drive, and wherein maintaining spare storage mapping information may further comprise techniques for wear-leveling of a plurality of blocks from throughout the storage drive pool.

In accordance with further aspects of this particular embodiment, wherein updating the spare storage mapping information may further comprise mapping to a second spare block in accordance with a fault tolerance of a parity-based configuration of the storage drive pool.

In accordance with further aspects of this particular embodiment, wherein the spare storage configuration information may comprise a number of spare blocks available in each storage drive of the plurality of storage drives.

In accordance with further aspects of this particular embodiment, wherein updating the spare storage mapping information of the failed block may further comprise determining that the first storage drive comprises a first number of spare blocks less than a threshold number of spare blocks, and determining that the second storage drive comprises a second number of spare blocks greater than or equal to the threshold number of spare blocks.

In accordance with further aspects of this particular embodiment, wherein updating the spare storage mapping information of the failed block further may comprise determining that mapping to the spare block of the second storage drive provides a higher fault tolerance for the storage drive pool than a mapping to a second spare block of the first storage drive.

In accordance with further aspects of this particular embodiment, which may further comprise monitoring the plurality of storage drives within the storage drive pool to detect SMART indicators.

In accordance with further aspects of this particular embodiment, which may further comprise determining that the first storage drive has entered a fault state, wherein the updated spare storage mapping to the spare block in the second storage drive may enable continued use of the first storage drive.

In another particular exemplary embodiment, the techniques may be realized as a system for spare storage pool management comprising one or more processors communicatively coupled to a network, wherein the one or more processors may be configured to maintain spare storage mapping information to spare storage within the storage drive pool based at least in part on the spare storage configuration information, monitor spare storage within the storage drive pool for detecting block failures within the storage drive pool, detect a failure of a block in a first storage drive of the plurality of storage drives, and update the spare storage mapping information associated with the failed block in the first storage drive to map to a spare block in a second storage drive of the plurality of storage drives.

In accordance with additional aspects of this particular embodiment, wherein the spare block may comprise at least one flash memory cell of a solid-state drive, and wherein maintain spare storage mapping information may further comprise techniques for wear-leveling of a plurality of blocks from throughout the storage drive pool.

In accordance with additional aspects of this particular embodiment, wherein update the spare storage mapping information may further comprise mapping to a second spare block in accordance with a fault tolerance of a parity-based configuration of the storage drive pool.

In accordance with additional aspects of this particular embodiment, wherein the spare storage configuration information may comprise a number of spare blocks available in each storage drive of the plurality of storage drives.

In accordance with additional aspects of this particular embodiment, wherein the one or more processors are further configured to determine that the first storage drive comprises a first number of spare blocks less than a threshold number of spare blocks, and determine that the second storage drive comprises a second number of spare blocks greater than or equal to the threshold number of spare blocks.

In accordance with additional aspects of this particular embodiment, wherein update the spare storage mapping information of the failed block may further comprise determine that mapping to the spare block of the second storage drive may provide a higher fault tolerance for the storage drive pool than a mapping to a second spare block of the first storage drive.

In yet another particular exemplary embodiment, the techniques may be realized as an article of manufacture for spare storage pool management, the article of manufacture comprising at least one non-transitory processor readable storage medium, and instructions stored on the at least one medium, wherein the instructions are configured to be readable from the at least one medium by at least one processor and thereby may cause the at least one processor to operate so as to maintain spare storage mapping information to spare storage within the storage drive pool based at least in part on the spare storage configuration information, monitor spare storage within the storage drive pool for detecting block failures within the storage drive pool, detect a failure of a block in a first storage drive of the plurality of storage drives, and update the spare storage mapping information associated with the failed block in the first storage drive to map to a spare block in a second storage drive of the plurality of storage drives.

In accordance with additional aspects of this particular embodiment, wherein the spare block may comprise at least one flash memory cell of a solid-state drive, and wherein maintain spare storage mapping information may further comprise techniques for wear-leveling of a plurality of blocks from throughout the storage drive pool.

In accordance with additional aspects of this particular embodiment, wherein update the spare storage mapping information may further comprise mapping to a second spare block in accordance with a fault tolerance of a parity-based configuration of the storage drive pool.

In accordance with additional aspects of this particular embodiment, wherein the spare storage configuration information may comprise a number of spare blocks available in each storage drive of the plurality of storage drives.

In accordance with additional aspects of this particular embodiment, the instructions may cause the at least one processor to operate further so as to determine that the first storage drive may comprise a first number of spare blocks less than a threshold number of spare blocks, and determine that the second storage drive may comprise a second number of spare blocks greater than or equal to the threshold number of spare blocks.

In accordance with additional aspects of this particular embodiment, wherein update the spare storage mapping information of the failed block may further comprise determine that mapping to the spare block of the second storage drive provides a higher fault tolerance for the storage drive pool than a mapping to a second spare block of the first storage drive.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
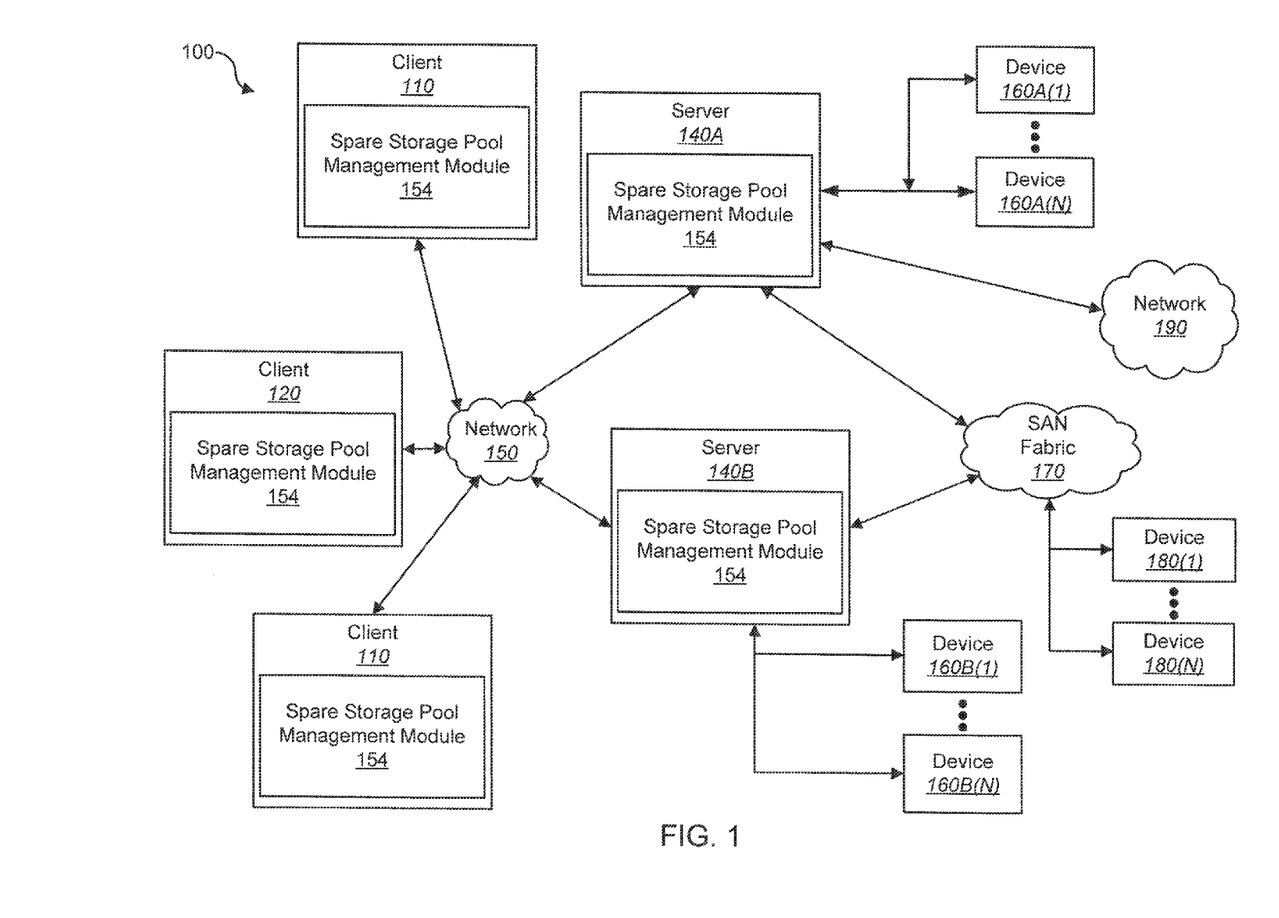
FIG. 1 shows a block diagram depicting a network architecture for spare storage pool management in accordance with an embodiment of the present disclosure.

FIG. 1 shows a block diagram depicting a network architecture 100 for spare storage pool management in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., spare storage pool management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
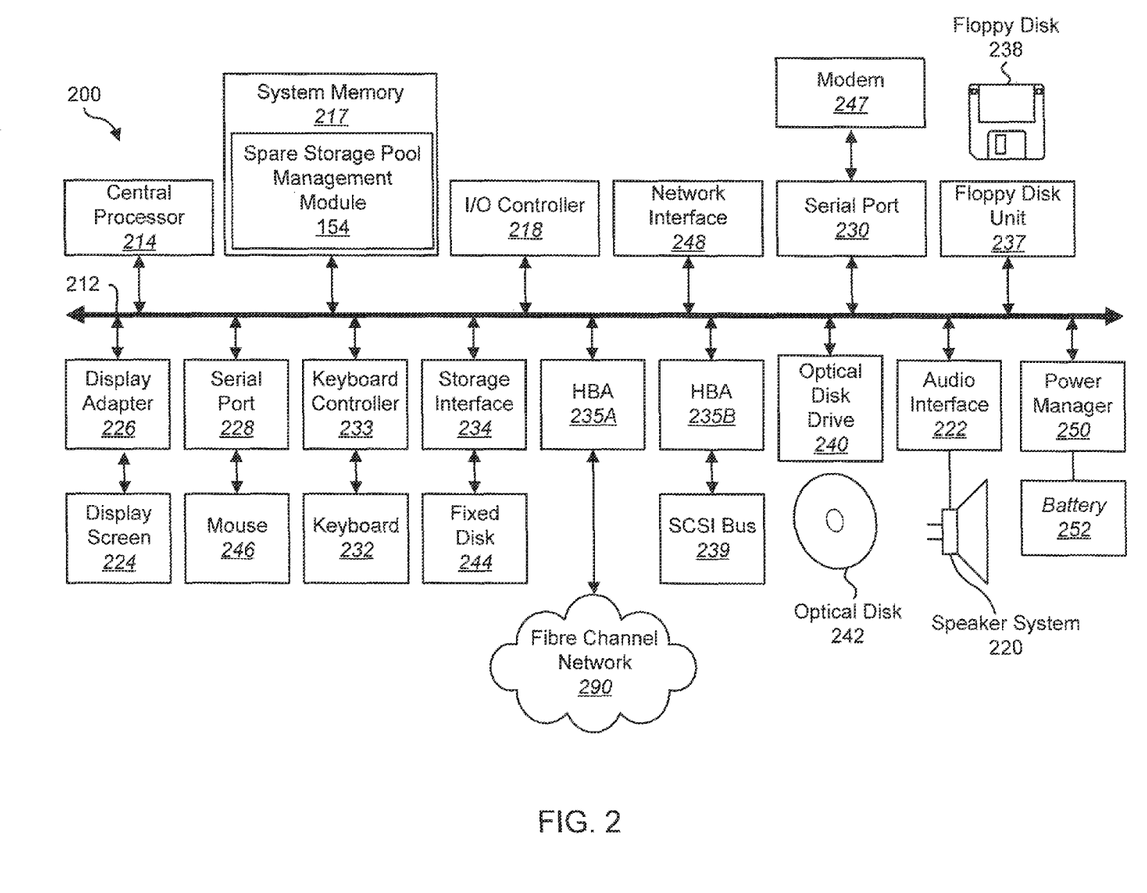
FIG. 2 depicts a block diagram of a computer system for spare storage pool management in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190.

Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for duplication such as, for example, spare storage pool management module 154. As illustrated, one or more portions of spare storage pool management module 154 may reside at a network centric location. For example, server 140A may be a server, a firewall, a gateway, or other network element that may perform one or more actions to scan web applications for vulnerabilities. According to some embodiments, network 190 may be an external network (e.g., the Internet) and server 140A may be a gateway or firewall between one or more internal components and clients and the external network. According to some embodiments, spare storage pool management module 154 may be implemented as part of a cloud computing environment.

FIG. 2 depicts a block diagram of a computer system 200 for duplication in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, spare storage pool management module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
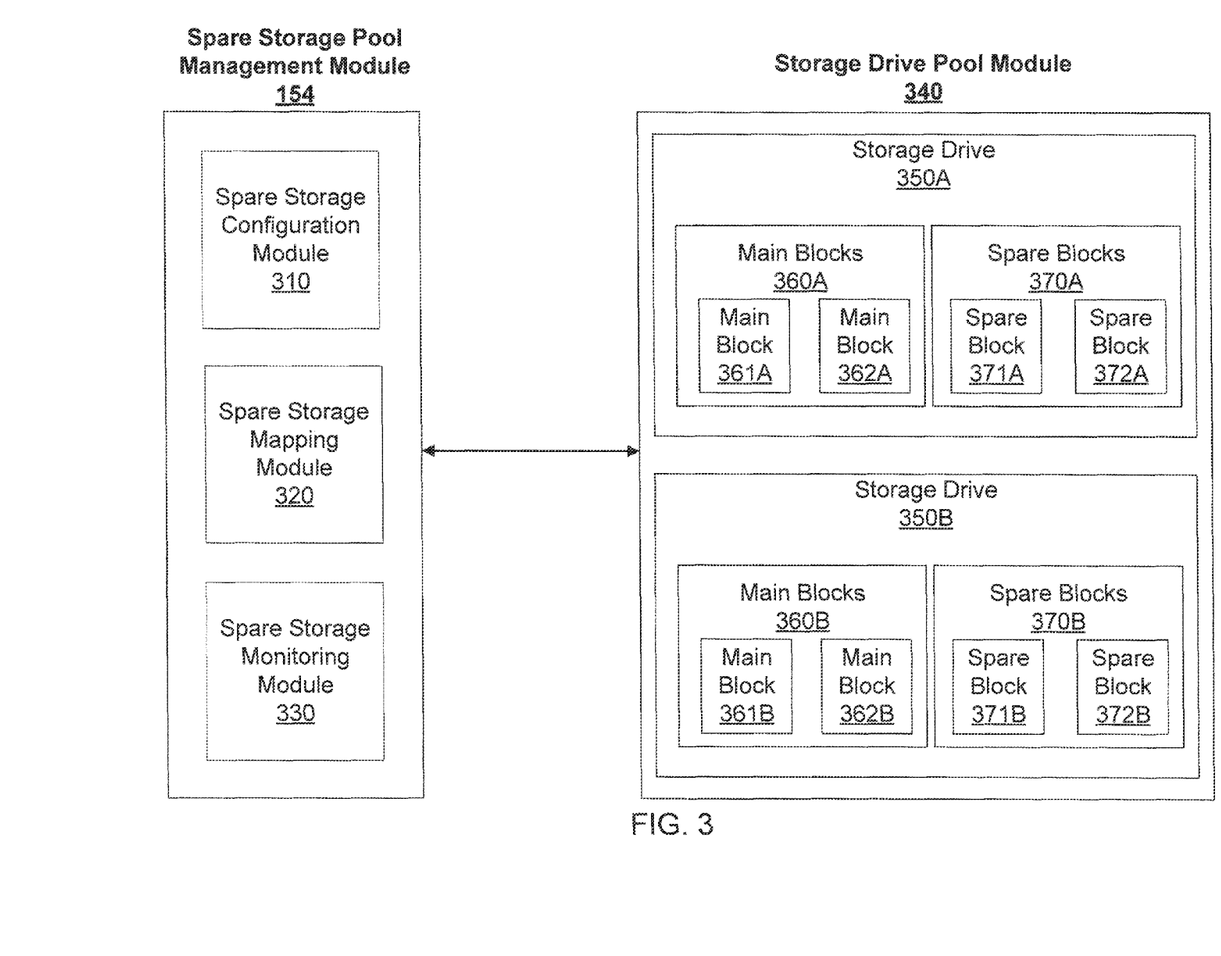
FIG. 3 shows a block diagram of a spare storage pool management module and a storage drive pool module in accordance with an embodiment of the present disclosure.

Referring to FIG. 3, there is shown modules of a spare storage pool management module 154 in accordance with an embodiment of the present disclosure. A spare storage pool management module 154 may contain one or more components including a spare storage configuration module 310, a spare storage mapping module 320, and a spare storage monitoring module 330.

The description below describes network elements, computers, and/or components of a system and method for duplication that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Spare storage pool management module 154 may be communicatively coupled to a storage drive pool module 340. In some embodiments, storage drive pool module 340 may be one of the several storage elements described above with respect to FIG. 1. For example, storage device 160A(1) may comprise the storage drive pool module 340. In other embodiments, the storage drive pool module 340 may comprise the plurality of storage devices 160A(1)-(N). Storage drive pool module 340 may comprise a separate element of network architecture 100 not otherwise shown in FIG. 1. Network architecture 100 may comprise one or more spare storage pool management modules including spare storage connected to one or more storage drive pool modules including storage drive pool module 340.

A storage drive pool may comprise one or more storage drives. According to some embodiments, storage drive pool module 340 comprises a first storage drive 350A and a second storage drive 350B. Storage drive pool module 340 may comprise an additional plurality of storage drives (not shown). In some embodiments, first storage drive 350A and second storage drive 350B may be communicatively coupled. In other embodiments, storage drive 350A and second storage drive 350B may not be communicatively coupled. Each storage drive of the storage drive pool module 340 may comprise its own storage drive controller (not shown), and storage drive pool module 340 may also comprise one or more storage drive pool controllers (not shown) that are communicatively coupled to all or some of the storage drives such as the first storage drive 350A and the second storage drive 350B. In some embodiments, the controller may be a RAID controller, and the storage drive pool may have a RAID configuration, including parity-based RAID or RAID-like configurations such as RAID-5, RAID-6, or similar.

The first storage drive 350A may comprise a plurality of blocks. Each block may be further subdivided into smaller storage elements (not shown). For example, a mechanical hard disk drive may comprise blocks that further comprise sectors of magnetized storage elements. For another example, a solid-state drive may comprise blocks that further comprise cells of flash memory, such as NAND flash memory. Each sector or cell may store one or more bits written to the storage drive pool module 340.

According to some embodiments, some blocks may be designated as main blocks for storing data written to the storage drive pool module 340, such as a first set of main blocks 360A. The first set of main blocks 360A comprise a plurality of blocks including a first main block 361A and a second main block 362A, in addition to any number of additional main blocks (not shown).

According to some embodiments, some other blocks may be reserved as spare blocks to replace main blocks as they fail, e.g., transition from a "good" block to a "bad" block. The first storage drive 350A may comprise a first set of spare blocks 370A. The first set of spare blocks 370A comprise a plurality blocks including a first spare block 371A and a second spare block 372A, in addition to any number of additional spare blocks (not shown).

In some embodiments, a storage drive may optionally not classify a block as being either a main block or a spare block. For example, a flash memory storage drive may use techniques such as wear-leveling techniques to spread write requests among all of the blocks to reduce the wear on any one block instead of, or in addition to reserving some blocks as spare blocks. The storage drive may be overprovisioned with additional blocks such that some subset of blocks may fail without the storage device falling below its stated capacity. Some storage drives may use a combination of wear-leveling techniques and reserved blocks classified as spare blocks.

In some embodiments, the second storage drive 350B may be configured similarly to the first storage drive 350A, comprising a second set of main blocks 360B and a second set of spare blocks 370B, wherein the second set of main blocks 360B further comprise a plurality of blocks including a third main block 361B, a fourth main block 362B, in addition to any number of additional main blocks (not shown), and wherein the second set of spare blocks 370B further comprise a plurality of blocks including a third spare block 371B and a fourth spare block 372B, in addition to any number of additional spare blocks (not shown).

Storage drive pool module 340 may comprise a uniform (or homogeneous) set of identically or nearly identically configured storage drives. In other embodiments, storage drive pool module 340 may comprise a heterogeneous set of arbitrarily configured storage drives. The heterogeneous set may contain drives of different stated capacities, types, speed, or number of spare blocks available, if any. In some embodiments, some storage drives may have zero spare blocks and zero overprovisioning, or some storage drives may exclusively consist of spare blocks. Although only two drives are shown in FIG. 3, any number of drives may be permitted or required. For example, RAID-5 configurations require a minimum of three storage drives, and RAID-6 configurations require a minimum of four storage drives.

In FIG. 3, returning to exemplary components of the spare storage pool management module 154, according to some embodiments, the spare storage configuration module 310 may be responsible for determining spare storage information about each storage drive in the storage drive pool module 340. The spare storage configuration module 310 may read out properties of a storage drive such as its type, capacity, speed, or number of reserved spare blocks, if any. In some embodiments, the spare storage configuration module 310 may be enabled to configure aspects of the storage drive pool module 340 or the aspects of individual storage drives with the storage drive pool module 340. For example, the spare storage configuration module 310 may be enabled to configure the first storage drive 350A to convert some number of spare blocks into main blocks, or vice versa. The spare storage configuration module 310 may also read out properties of the storage drive pool module 340, such as whether it is configured in a particular RAID configuration.

The spare storage configuration module 310 may be communicative coupled to one or more other components of the spare storage pool management module 154 such as spare storing mapping module 320, spare storage monitoring module 330, and/or other elements not shown, such as a spare storage pool management controller (not shown). The spare storage configuration module 310 may read or write properties during initialization of the spare storage pool management module 154, and it may read or write properties during operation of the spare storage pool management module 154 thereafter. The spare storage configuration module 310 may communicate information about the storage drive pool module 340 to other components, including but not limited to properties such as the total number of storage drives in the storage drive pool module 340, the total number of spare blocks across all of the storage drives in the storage drive pool module 340, or whether the storage drive pool module 340 is configured in a particular RAID configuration.

The spare storage mapping module 320 may be responsible for determining which spare blocks, if any, should receive read and write requests from other components within the network architecture 100 or the computer system 200. For example, the spare storage mapping module 320 may convert a logical memory addresses designated by an external element into a physical block address within the storage drive pool module 340. In other embodiments, the spare storage mapping module 320 may convert a first logical memory address designated by an external element into a second logical memory address, which in turn may be converted into a physical address by the storage drive pool module 340 or a storage drive such as storage drive 350A. In some embodiments, the spare storage mapping module 320 may map a particular logical address to a specific block, such as main block 361A or spare block 371B. In other embodiments, the spare storage mapping module 320 may map a particular first logical address to a second logical address designating particular set of blocks, such as main blocks 360A or spare blocks 370B, and in turn the storage drive pool module 340 or the a particular storage drive further maps the second logical address to a specific block, such as main block 361A or spare block 371B.

The spare storage mapping module 320 may receive information from other components, such as the spare storage monitoring module 330, regarding the state of a particular block, set of blocks, storage drive, or the storage drive pool module 340. In response to information received, the spare storage mapping module 320 may adjust a particular mapping, whereby a particular logical address may map to a different physical address following the adjustment.

The spare storage mapping module 320 may treat sets of spare blocks from distinct storage drives, such as the first set of spare blocks 370A on the first storage drive 350A and the second set of spare blocks 370B on the second storage drive 350B, as a unified spare storage pool. In this way, one or more spare blocks of one or more storage drives may be used to replace a failed main block of a different storage drive. For example, if the first main block 361A fails, the spare storage mapping module 320 may choose any available spare blocks in the unified spare block pool to replace the failed main block 361A.

In some embodiments, the spare storage mapping module 320 may preferentially select a spare block available within the same storage drive 350A such as the first spare block 371A. In other embodiments, the spare storage mapping module 320 may preferentially select a spare block that will result in optimal fault tolerance. For example, remapping from failed main block 361A on the first storage drive 350A to the third spare block 371B on the second storage drive 350B may result in greater fault tolerance than if the first spare block 371A had been selected. For another example, the spare storage mapping module 320 may determine a threshold or average number of available spare blocks for an individual storage drive and may map to spare blocks within a storage drive with a number of available spare blocks that is greater than the determined threshold or average number of available spare blocks.

In yet another example, the spare storage mapping module 320 may copy data to at least one additional spare block to maintain the fault-tolerance required for certain storage drive pool configurations, such as parity-based configurations in RAID-5, RAID-6, or similar configurations. Alternatively, spare storage mapping module may change mappings based on any number of possible techniques, including random selection, or a round-robin selection, etc.

Furthermore, according to some embodiments, the spare storage mapping module 320 need not wait for a block to fail before changing a mapping. For example, the spare storage mapping module 320 may implement a wear-leveling technique for flash memory components of the storage drive pool module 340. This wear-leveling technique substitute or complement other wear-leveling techniques carried out by components of the storage drive pool module 340 or any of the individual storage drives.

According to some embodiments, regardless of the mapping and remapping techniques used by the spare storage mapping module 320, the spare storage mapping module 320 increases the MTBF of individual storage drives. If a storage drive were limited to its own set of spare blocks, the storage drive may fail or otherwise enter a fault state and need to be replaced when enough blocks failed that its set of spare blocks approached or reached zero. Because the spare storage mapping module 320 may replace a failed block of one storage drive with a spare block of a different storage drive, any given storage drive may not be limited to its own set of spare blocks. Instead, the spare blocks may be pooled and used as needed across any number of storage drives with the storage drive pool module 340. Thus, similar to the way pooling storage drives in a storage drive pool such as storage drive pool module 340 increases the overall capacity available to its host system, pooling spare storage in a spare storage pool managed by the spare storage pool management module 154 increases the overall reliability, redundancy, and fault tolerance of the storage drive pool module 340.

In some embodiments, the spare storage pool mapping functionality may not be limited to the functionality of the spare storage mapping module 320 or even the spare storage pool management module 154 as a whole. For example, spare storage pool mapping functionality may be implemented on a storage pool layer of an operating system by reserving a group of available blocks (e.g., sets of spare blocks) on each storage drive for this spare pool, or it may be implemented in the firmware of each storage drive, which expose inner mappings or other configurations and properties of spare blocks in each respective storage drive.

The spare storage monitoring module 330 may be communicatively coupled to components of the spare storage pool management module 154 such as the spare storage mapping module 320. The spare storage monitoring module 330 may be responsible for monitoring one or more statuses or properties of the storage drive pool module 340, as well as monitoring storage drives in the pool such as the first storage drive 350A and the second storage drive 350B. For example, in some embodiments, the spare storage monitoring module 330 may be capable of detecting when a block has failed within the storage drive pool module 340 and communicate information about the block failure to the spare storage mapping module 320.

In some embodiments, the spare storage monitoring module 330 may detect Self-Monitoring, Analysis and Reporting ("SMART") indicators or customized variations of SMART from the storage drives. The spare storage monitoring module 330 may receive warnings related to reliability or anticipated failure of a storage drive. In response to such warnings or other indicators of anticipated or actual failure, the spare storage monitoring module 330 may generate a report indicating the nature of the warning or indicator and may further generate a recommended course of action, such as recommending replacement of a particular storage drive.

Figure 4:
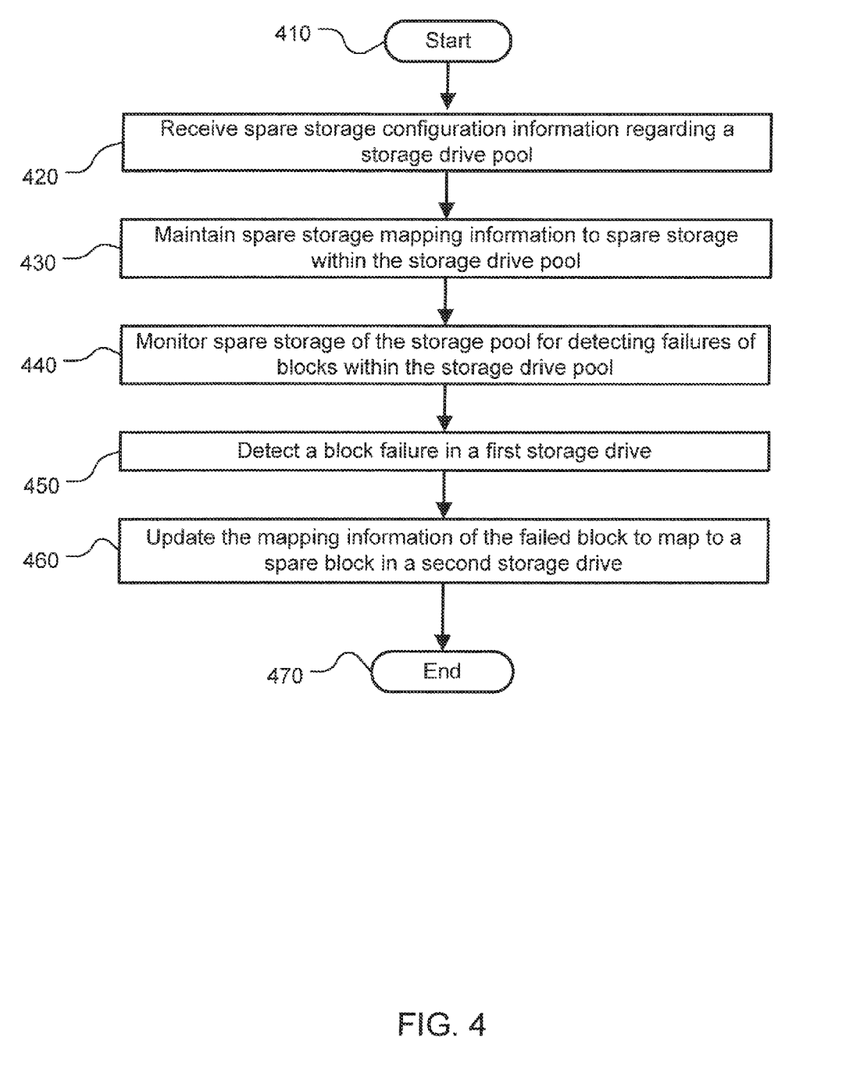
FIG. 4 shows a method for spare storage pool management in accordance with an embodiment of the present disclosure.

In some embodiments, the spare storage monitoring module 330 may generate regular reports at periodic intervals, including reports that no warnings or other indicators had been received or otherwise detected. The spare storage monitoring module 330 may detect, track, or store other metrics and measurements regarding the storage drive pool module 340, as well as for the individual storage drives or blocks therein. For example, the spare storage monitoring module 330 may use a combination of storage drive specifications and/or storage drive measurements to compute the MTBF for any storage drive of the storage drive pool module 340. Referring to FIG. 4, there is depicted a method 400 for spare storage pool management in accordance with an embodiment of the present disclosure. At block 410, the method 400 may begin.

At block 420, spare storage configuration information may be received regarding a storage drive pool. In some embodiments, the spare storage configuration information may be an index to the spare blocks available in each of the storage drives in the storage drive pool. In some embodiments, the spare storage configuration may be continuously updated. After some or all of at least the initial configuration information has been received, the method may proceed to block 430.

At block 430, spare storage mapping information to spare storage within the storage drive pool may be maintained. In some embodiments, maintenance of the spare storage mapping information may include generating initial spare storage mapping information when the system is first initialized or powered on. Maintenance may also include continuously updating according to one or more techniques for storage drive pool management such as wear leveling techniques. After at least some or all of the initial spare storage mapping information has been generated or maintained, the method may proceed to block 440. In some embodiments, the method may proceed to block 440 prior to or in parallel with the preceding blocks.

At block 440, spare storage of the storage pool may be monitored for detecting failures of blocks within the storage drive pool. Other indicators of anticipated failures such as SMART warnings or other messages may be monitored or received as well.

At block 450, a block failure in a first storage drive may be detected. The failed block may have failed for any reason. For example, if the block is comprised of flash memory cells, one or more flash memory cells within the failed block may have worn out. In some embodiments, multiple block failures may be detected simultaneously. In still other embodiments, block failures may be reported (e.g., "pushed") from the storage drive pool such as storage drive pool module 340. Alternatively, a monitoring module such as spare storage monitoring module 330 may request (e.g., pull, poll, etc.) status checks or issue other commands to the storage drive pool or individual storage drives.

At block 460, in response to detecting a failed block in the first storage drive, the mapping information may be updated to map to one or more spare blocks on a second storage drive instead of the failed block on the first storage drive. In some embodiments, the spare block may come from any spare block in the spare storage pool, comprising the set of spare blocks available in any or all of the storage drives in the storage drive pool.

At block 480, the method 400 may end.

At this point it should be noted that spare storage pool management in accordance with the present disclosure as described above may involve the processing of input data and the generation of output data to some extent. This input data processing and output data generation may be implemented in hardware or software. For example, specific electronic components may be employed in a spare storage pool management module or similar or related circuitry for implementing the functions associated with spare storage pool management in accordance with the present disclosure as described above. Alternatively, one or more processors operating in accordance with instructions may implement the functions associated with spare storage pool management in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for spare storage pool management comprising:

receiving spare storage configuration information for a storage drive pool comprising a plurality of storage drives;

maintaining spare storage mapping information to spare storage within the storage drive pool based at least in part on the spare storage configuration information;

monitoring spare storage within the storage drive pool for detecting block failures within the storage drive pool;

detecting a failure of a block in a first storage drive of the plurality of storage drives; and updating the spare storage mapping information associated with the failed block in the first storage drive to map to a spare block in a second storage drive of the plurality of storage drives, wherein the updating further comprises determining that mapping to the spare block of the second storage drive provides a higher fault tolerance for the storage drive pool than a mapping to a second spare block of the first storage drive.

2. The method of claim 1, wherein the spare block comprises at least one flash memory cell of a solid-state drive, and wherein maintaining spare storage mapping information further comprises techniques for wear-leveling of a plurality of blocks from throughout the storage drive pool.

3. The method of claim 1, wherein updating the spare storage mapping information further comprises mapping to a second spare block in accordance with a fault tolerance of a parity-based configuration of the storage drive pool.

4. The method of claim 1, wherein the spare storage configuration information comprises a number of spare blocks available in each storage drive of the plurality of storage drives.

5. The method of claim 1, wherein updating the spare storage mapping information of the failed block further comprises:
determining that the first storage drive comprises a first number of spare blocks less than a threshold number of spare blocks; and
determining that the second storage drive comprises a second number of spare blocks greater than or equal to the threshold number of spare blocks.

6. The method of claim 1, further comprising monitoring the plurality of storage drives within the storage drive pool to detect SMART indicators.

7. The method of claim 1, further comprising determining that the first storage drive has entered a fault state, wherein the updated spare storage mapping to the spare block in the second storage drive enables continued use of the first storage drive.

8. A system for spare storage pool management comprising:
one or more processors communicatively coupled to a network; wherein the one or more processors are configured to:
maintain spare storage mapping information to spare storage within the storage drive pool based at least in part on the spare storage configuration information;
monitor spare storage within the storage drive pool for detecting block failures within the storage drive pool;
detect a failure of a block in a first storage drive of the plurality of storage drives; and
update the spare storage mapping information associated with the failed block in the first storage drive to map to a spare block in a second storage drive of the plurality of storage drives, wherein the update further comprises determining that mapping to the spare block of the second storage drive provides a higher fault tolerance for the storage drive pool than a mapping to a second spare block of the first storage drive.

9. The system of claim 8, wherein the spare block comprises at least one flash memory cell of a solid-state drive, and wherein maintain spare storage mapping information further comprises techniques for wear-leveling of a plurality of blocks from throughout the storage drive pool.

10. The system of claim 8, wherein update the spare storage mapping information further comprises mapping to a second spare block in accordance with a fault tolerance of a parity-based configuration of the storage drive pool.

11. The system of claim 8, wherein the spare storage configuration information comprises a number of spare blocks available in each storage drive of the plurality of storage drives.

12. The system of claim 8, wherein the one or more processors are further configured to:
determine that the first storage drive comprises a first number of spare blocks less than a threshold number of spare blocks; and
determine that the second storage drive comprises a second number of spare blocks greater than or equal to the threshold number of spare blocks.

13. An article of manufacture for spare storage pool management, the article of manufacture comprising:
at least one non-transitory processor readable storage medium; and
instructions stored on the at least one medium;
wherein the instructions are configured to be readable from the at least one medium by at least one processor and thereby cause the at least one processor to operate so as to:
maintain spare storage mapping information to spare storage within the storage drive pool based at least in part on the spare storage configuration information;
monitor spare storage within the storage drive pool for detecting block failures within the storage drive pool;
detect a failure of a block in a first storage drive of the plurality of storage drives; and
update the spare storage mapping information associated with the failed block in the first storage drive to map to a spare block in a second storage drive of the plurality of storage drives, wherein the update further comprises determining that mapping to the spare block of the second storage drive provides a higher fault tolerance for the storage drive pool than a mapping to a second spare block of the first storage drive.

14. The article of manufacture of claim 13, wherein the spare block comprises at least one flash memory cell of a solid-state drive, and wherein maintain spare storage mapping information further comprises techniques for wear-leveling of a plurality of blocks from throughout the storage drive pool.

15. The article of manufacture of claim 13, wherein update the spare storage mapping information further comprises mapping to a second spare block in accordance with a fault tolerance of a parity-based configuration of the storage drive pool.

16. The article of manufacture of claim 13, wherein the spare storage configuration information comprises a number of spare blocks available in each storage drive of the plurality of storage drives.

17. The article of manufacture of claim 13, wherein the instructions cause the at least one processor to operate further so as to:
determine that the first storage drive comprises a first number of spare blocks less than a threshold number of spare blocks; and determine that the second storage drive comprises a second number of spare blocks greater than or equal to the threshold number of spare blocks.

* * * * *